United States Patent [19]

Tsukaya

[11] 4,344,684
[45] Aug. 17, 1982

[54] AUTOMATIC PHOTOFLASH DEVICE

[75] Inventor: Takashi Tsukaya, Hachioji, Japan

[73] Assignee: Olympus Optical Co., Ltd., Tokyo, Japan

[21] Appl. No.: 236,903

[22] Filed: Feb. 23, 1981

[30] Foreign Application Priority Data

Feb. 27, 1980 [JP] Japan .................................. 55/23872

[51] Int. Cl.³ ............................................ G03B 15/02
[52] U.S. Cl. .................................... 354/128; 354/145; 354/289
[58] Field of Search ...................... 354/32, 33, 35, 126, 354/127, 128, 289, 145

[56] References Cited

U.S. PATENT DOCUMENTS

| 2,719,288 | 9/1955 | Young . | |
|---|---|---|---|
| 3,591,829 | 7/1971 | Murata . | |
| 3,626,401 | 12/1971 | Flieder . | |
| 3,898,514 | 8/1975 | Takahashi . | |
| 3,953,928 | 11/1976 | Wilwerding . | |
| 4,122,465 | 10/1978 | Hasegawa | 354/128 |
| 4,193,677 | 3/1980 | Hasegawa et al. . | |

FOREIGN PATENT DOCUMENTS

| 54-29036 | of 0000 | Japan . | |
|---|---|---|---|
| 54-162258 | of 0000 | Japan . | |
| 55-12929 | 1/1980 | Japan | 354/128 |
| 1431394 | 4/1976 | United Kingdom . | |
| 2024451 | 1/1980 | United Kingdom | 354/128 |

Primary Examiner—Russell E. Adams
Attorney, Agent, or Firm—Frishauf, Holtz, Goodman & Woodward

[57] ABSTRACT

An automatic photoflash device wherein detection is made of a level of voltage charged in a main capacitor for supplying discharge energy to an electronic flash tube and also of a level of voltage charged in a quenching capacitor of a quenching circuit to interrupt the flash irradiation of the electronic flash tube. The subject automatic photoflash device comprises an alarm unit, which, when a voltage charged in the main capacitor has a lower level than required to allow for the light emission of the flash device, gives a first alarm, and, when a voltage charged in the quenching capacitor has too low a level to allow for the quenching of the flash tube, sends forth a second alarm.

3 Claims, 2 Drawing Figures

AUTOMATIC PHOTOFLASH DEVICE

BACKGROUND OF THE INVENTION

This invention relates to an automatic photoflash device and more particularly to an automatic photoflash device informing the operator of an insufficient exposure.

In an automatic photoflash device, a flash tube is triggered in response to a synchronizing signal to radiate a light flash by the discharge of a main capacitor. When a proper exposure is obtained, the electrical energy charged in a quenching capacitor backward biases the main thyristor connected in series with the main capacitor, rendering the main thyristor nonconducting and interrupting the flash radiation of the flash tube. Where, however, an insufficient charge of the main capacitor causes the flash tube to fail to emit a light flash or emit an insufficient light flash, then proper exposure can not be effected. Further where the quenching capacitor is incompletely charged, then the photoflash device cannot interrupt a light fash, probably resulting in an overexposure. The failure to interrupt a light flash takes place particularly where an object is photographed by a photoflash device at a short distance. In the case of photographing at a short distance, the quenching capacitor is discharged, but the main capacitor is little discharged. Where, therefore, the flash tube is flashed frequently at a short interval, then it becomes impossible to interrupt a light flash.

It is accordingly the object of this invention to provide an automatic photoflash device which definitely indicates complete readiness for the normal radiation of a light flash and the termination of the light flash.

SUMMARY OF THE INVENTION

To attain the above-mentioned object, this invention provides an automatic photoflash device, comprising means for detecting a level of voltage charged in a main capacitor for supplying a discharge energy to an electronic flash tube and also a level of voltage charged in a quenching capacitor of a quenching circuit, and alarm display means which when the main capacitor is not fully charged, sends forth a first sound, and when neither the main capacitor nor quenching capacitor is fully charged, produces a second sound.

DETAILED DESCRIPTION

Figure 1:
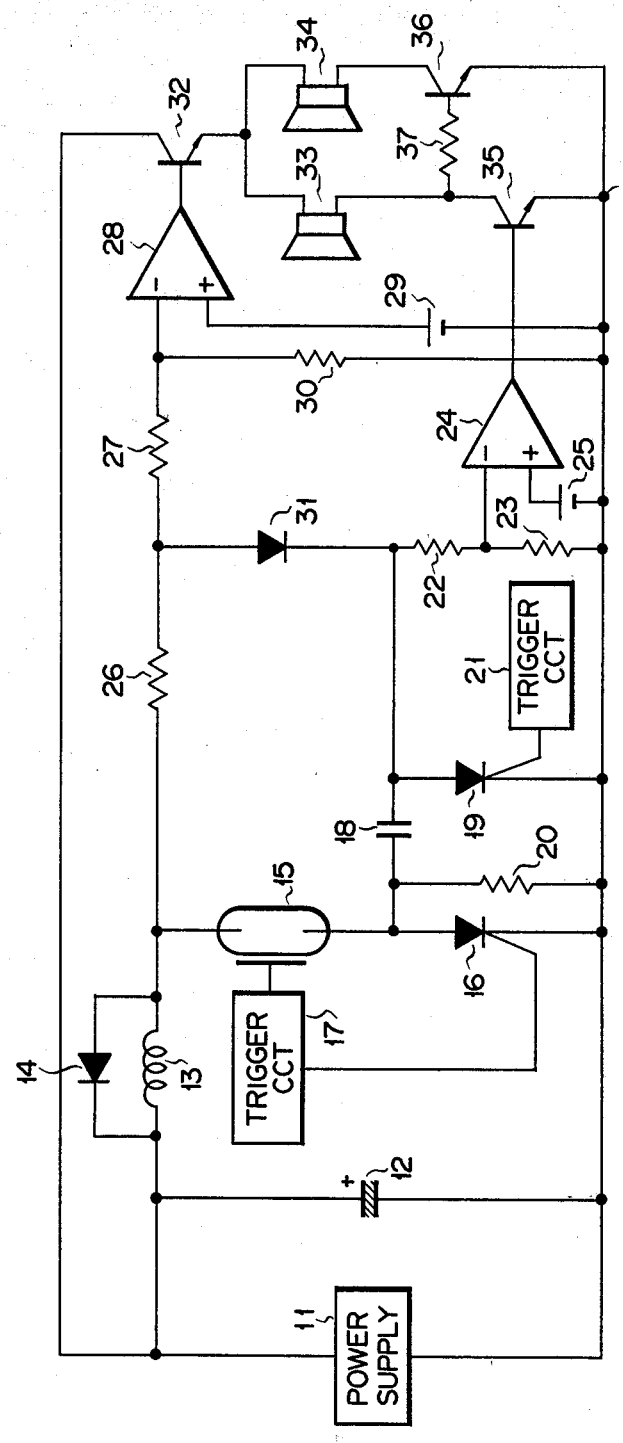
FIG. 1 is a circuit diagram of an automatic photoflash device according to one embodiment of this invention.

Referring the FIG. 1, a main capacitor 12 is connected in parallel with a power source 11. One of the terminals of the main capacitor 12 is connected to one of the electrodes of an electronic flash tube 15 through a parallel circuit of a coil 13 and diode 14. The other electrode of the electronic flash tube 15 is connected to the other terminal of the main capacitor 12. A trigger circuit 17 is connected to the trigger electrode of the electronic flash tube 15 and the gate of a main thyristor 16. The trigger circuit 17 sends forth a trigger signal in synchronization with the actuation of the X contact of a camera. The anode of the main thyristor 16 is connected to a cathode through a quenching capacitor 18 of a quenching circuit and quenching thyristor 19. A resistor 20 is connected in parallel to the main thyristor 16. A trigger circuit 21 is connected to the gate of the quenching capacitor 18. The trigger circuit 21 issues a trigger signal in response to an output signal from an ordinary light-measuring circuit (not shown) containing an integrator for integrating a photoelectric current of a light-receiving element (photodiode). The anode of the quenching thyristor 19 is connected to a cathode through resistors 22, 23. A junction of the resistors 22, 23 is connected to an inverting input terminal of an operation amplifier 24. The noninverting input terminal of the operation amplifier 24 is connected to a reference voltage source 25.

One of the terminals of the electronic flash tube 15 is connected to the inverting input terminal of an operational amplifier 28 through resistors 26, 27. The noninverting input terminal of the operational amplifier 28 is connected to a reference voltage source 29. The inverting input terminal of the operational amplifier 28 is connected to the other terminal of the main capacitor 12 through a resistor 30. A diode 31 is connected between a junction of the resistors 26, 27 and the quenching capacitor 18. The output terminal of the operational amplifier 28 is connected to the base of a transistor 32, whose emitter is connected to one of the terminals of a buzzer 33 and also to one of the terminals of another buzzer 34. The other terminal of the buzzer 33 is connected to the power source 11 through a transistor 35. The other terminal of the buzzer 34 is connected to the power source 11 through a transistor 36. The base of the transistor 35 is connected to the output terminal of the operational amplifier 24. The base of the transistor 36 is connected to the collector of the transistor 35 through a resistor 37.

Where the power source 11 of an automatic photoflash device arranged as described above is actuated, then the main capacitor 12 and quenching capacitor 18 are charged. Voltage charged in the main capacitor 12 is divided by the resistors 26, 27 and 30 and supplied to the inverting input terminal of the operational amplifier 28. The voltage charged in the capacitor 18 is divided by the diode 31 and resistors 20 and 26 and supplied to the inverting input terminal of the operational amplifier 28. The voltage charged in the capacitor 18, also, is divided by the resistors 22 and 23 and supplied to the inverting input terminal of the operational amplifier 24. A reference voltage is impressed on the noninverting input terminal of the operational amplifier 28 from the reference voltage source 29. The reference voltage is set at such value that an output signal from the operational amplifier 28 has a high level, when a voltage charged in the main capacitor 12 does not reach a sufficiently high level to start discharge or when a voltage charged in the quenching capacitor 18 does not reach a sufficiently high level to allow for quenching. The reference voltage impressed on the noninverting input terminal of the operational amplifier 24 from the reference voltage source is set at such value that an output signal from the operational amplifier 24 has a high level, when the voltage charged in the quenching capacitor 18 does not reach a sufficiently high level to allow for quenching. When the main capacitor 12 and quenching capacitor 18, therefore, are insufficiently charged, then the transistors 32, 35 are actuated to cause the buzzer 33 to sound, thereby enabling the operator to recognize that automatic flash photographing has been performed incompletely. Where the main capacitor 12 and quenching capacitor 18 are fully charged, then output signals from the operational amplifiers 24, 28 have a low level to render the transistors 32 and 35 nonconducting, thereby preventing both buzzers 33 and 34 from sounding. At this time, automatic flash photographing can be carried out satisfactorily. Where, under this condition, a camera release button, for example, is depressed to actuate the X contact of the camera, then the trigger circuit 17 sends forth a trigger signal to trigger the electronic flash tube 15 and main thyristor 16. As a result, the electronic flash tube 15 emits a light flash by the discharge of the main capacitor 15. Where the light-measuring circuit determines a proper exposure, then the trigger circuit 21 supplies a trigger signal to the quenching thyristor 19, which in turn is rendered conducting. Therefore, a voltage charged in the quenching capacitor 18 is supplied to the main thyristor 16 as a reverse bias through the quenching thyristor 19. As a result, the main thyristor 16 is rendered nonconducting to interrupt the flash radiation. Where both capacitors 12 and 18 are fully charged and a charged voltage reaches a sufficiently high level to start discharge and allow for quenching, then automatic flash photographing is completely performed to provide a properly exposed photograph.

Where an automatic photoflash device is operated in a state capable of adjusting or interrupting a light flash, then the main capacitor 12 and quenching capacitor 18 are discharged. Where the photoflash device fully radiates a light flash, then the main capacitor 12 is discharged almost completely. Where, however, photoflash photographing is carried out at a short distance from a foreground subject, interruption of flash radiation takes place too soon. Therefore, the main capacitor 12 is little discharged, whereas the quenching capacitor 18 is discharged, almost completely. In either case, both capacitors 12 and 18 are again charged after the flash radiation. In the case of normal flash radiation, the quenching capacitor 18 is impressed with a sufficiently high level of voltage to allow for quenching, before the main capacitor 12 is impressed with a sufficiently high level of voltage to start discharge. At this time, an output signal from the operational amplifier 28 has a high level, while an output signal from the operation amplifier 24 has a low level. As a result, the transistor 32 is rendered conducting, the transistor 35 is rendered nonconducting and the transistor 36 is operated, causing the buzzer 34 to sound. The sounding of this buzzer 34 indicates that the main capacitor 12 is charged incompletely. The cases where the buzzers 33 and 34 sound or do not sound may be summarized as follows.

1. Neither of the buzzers 33 and 34 sounds, where both main capacitor 12 and quenching capacitor 18 are fully charged.

2. While the main capacitor 12 is in the process of being charged after normal flash radiation, the buzzer 34 sounds.

3. While the quenching capacitor 18 is in the process of being charged (when a flash radiation is interrupted at a very short time), the buzzer 33 sounds.

4. While both main and quenching capacitors 12 and 18 are in the process of being charged (when quenching is applied immediately before normal flash radiation), the buzzer 33 sounds.

The sounding of either of the buzzers 33 or 34 indicates that either or both of the main and quenching capacitors 33 and 34 are insufficiently charged, probably resulting in improper exposure. Under-exposure or over-exposure can be distinguished according to the type of buzzer which sounds.

Figure 2:
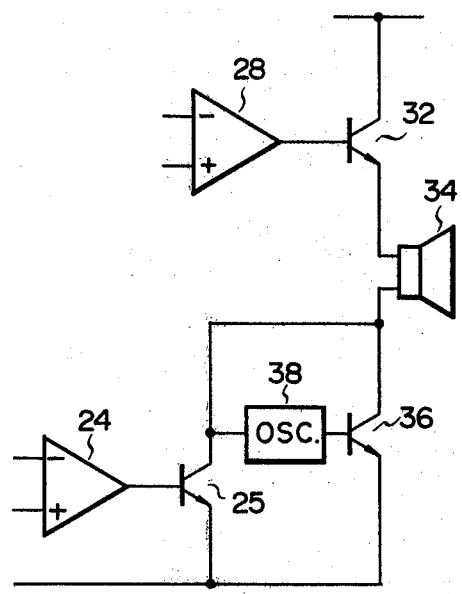
FIG. 2 is a circuit diagram of a sound-producing circuit of an automatic photoflash device according to another embodiment of the invention.

With the first embodiment of FIG. 1, two buzzers are used. In contrast, the second embodiment of FIG. 2 comprises a single buzzer 34, which is so arranged as to produce sounds having different tones as occasion needs. Referring to FIG. 2, a multivibrator 38 is connected between the collector of a transistor 25 and the base of a transistor 36. Where output signals from both operational amplifiers 24 and 28 have a high level, namely, where quenching is disabled, then the buzzer 34 continuously sounds. Where an output signal from the operational amplifier 28 has a high level and an output signal from the operational amplifier 24 has a low level, namely, where the main capacitor 12 is insufficiently charged, then an output signal from the multivibrator 38 causes the transistor 36 to be intermittently rendered conducting and nonconducting. As a result, the buzzer 34 sounds intermittently. If the multivibrator 38 is replaced by a sound generator (manufactured, for example, by Texas Instrument Co. Inc. of the United States of America with the designation SN 76477) which sends forth a sound like a bell or bird, then an easily distinguishable sound can be generated.

As described above, an automatic photoflash device embodying this invention produces a sound, while either or both of the main and quenching capacitors are in the process of being charged, no matter whether an exposure is proper or improper. This arrangement prevents a shutter from being depressed before charging is fully carried out and also avoids improper light irradiation such as excess flash radiation resulting from erroneous quenching. Further, the automatic photoflash device of the invention makes it possible to recognize the condition of improper exposure according to the tone or kind of a sound produced.

What is claimed is:

1. An automatic photoflash device comprising:
   an electronic flash tube;
   a source of power;
   a main capacitor coupled to said electronic flash tube and coupled to said power source so as to be charged to a predetermined voltage by said power source for supplying a discharge current to said electronic flash tube;
   a main thyristor connected in series with said electronic flash tube;
   means for rendering said main thyristor conductive to thereby cause said main capacitor to supply said discharge current to said electronic flash tube to emit light;
   a quenching circuit for automatically terminating a flash, and including a quenching thyristor coupled to said main thyristor for causing said main thyristor to become nonconductive to thereby cause said electronic flash tube to stop emitting light, said quenching thyristor being rendered conductive responsive to a trigger signal, and a quenching capacitor for applying a backward bias to said main thyristor through said quenching thyristor;
   a first detector means coupled to said main capacitor for detecting the charge voltage of said main capacitor and generating a first output signal when the detected charge voltage of said main capacitor is too low to trigger said electronic flash tube;

a second detector means coupled to said quenching capacitor for detecting the charge voltage of said quenching capacitor and generating a second output signal when the detected charge voltage of said quenching capacitor is lower than a predetermined value; and an alarm means coupled to said first and second detector means for indicating, in response to said first output signal, that said electronic flash tube is unable to emit light, and for indicating, in response to said second output signal, that automatic flash termination is impossible.

2. The automatic photoflash device of claim 1, wherein said alarm means comprises a first alarm device for issuing a first alarm sound in response to said first output signal; and a second alarm device for issuing a second alarm sound in response to said second output signal.

3. The automatic photoflash device of claim 2, wherein one of said first and second alarm sounds is a continuous sound, and the other of said first and second alarm sounds is an intermittent sound.

* * * * *

UNITED STATES PATENT AND TRADEMARK OFFICE
CERTIFICATE OF CORRECTION

PATENT NO. : 4,344,684
DATED : August 17, 1982
INVENTOR(S) : Takashi TSUKAYA

It is certified that error appears in the above-identified patent and that said Letters Patent is hereby corrected as shown below:

COLUMN 3, line 46, after "signal from the" change "operation" to --operational--.

Signed and Sealed this

Eighteenth Day of January 1983

[SEAL]

Attest:

GERALD J. MOSSINGHOFF

Attesting Officer

Commissioner of Patents and Trademarks